United States Patent [15] 3,692,885
Anello et al. [45] Sept. 19, 1972

[54] POLYHALOISOALKOXYALKYL PHOSPHATE ESTERS

[72] Inventors: Louis G. Anello, Basking Ridge; Richard F. Sweeney, Dover; Edward S. Jones, Whippany; John T. Walsh, Lake Hiawatha; John J. Thompson, Jr., Chatham, all of N.J.

[73] Assignee: Allied Chemical Corporation, New York, N.Y.

[22] Filed: Aug. 14, 1969

[21] Appl. No.: 850,235

[52] U.S. Cl. .................260/950, 117/142, 117/147, 117/154, 260/247.7 D, 260/297 P, 260/535 H, 260/543 R, 260/614 F, 260/633, 260/924, 260/925, 260/980, 162/158
[51] Int. Cl. .........................C07f 9/08, D21h 1/38
[58] Field of Search..............260/950, 925, 955, 924

[56] References Cited

UNITED STATES PATENTS 2,754,317  7/1956  Conly....................260/950 X
3,492,374  1/1970  Bleu et al...............260/950 X Primary Examiner—Joseph Rebold
Assistant Examiner—Anton H. Sutto
Attorney—Jay P. Friedenson

[57] ABSTRACT

This invention relates to novel phosphate esters of the formula

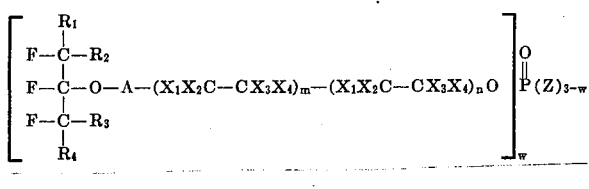

wherein
a. $R_1$–$R_4$ are independently fluorine, chlorine or alkyl or haloalkyl groups of one to 10 carbon atoms;
b. A is a radical of the formula —$(CFR_5-CR_6R_7)$— in which $R_5$ and $R_6$ are independently fluorine or hydrogen, and $R_7$ is hydrogen, fluorine, chlorine, bromine or perfluoroalkyl;
c. $X_1$–$X_4$ are independently hydrogen, fluorine, chlorine or bromine, provided that $X_1$–$X_4$ do not include more than two chlorine atoms or one bromine atom;
d. Z is selected from the group consisting of chlorine, hydroxy, amino, substituted amino and OY wherein Y is a hydrocarbyl or hydroxy-substituted hydrocarbyl, or a water solubilizing cationic ion.
e. $m$ is an integer from 1 to 10, $n$ is an integer from 0 to 10 and $w$ is an integer from 1 to 3.

Said phosphate esters are useful for imparting oil and stain repellent properties to various materials, especially to paper.

43 Claims, No Drawings

POLYHALOISOALKOXYALKYL PHOSPHATE ESTERS

CROSS REFERENCES TO RELATED APPLICATIONS

1. Copending application of Anello et al., entitled "Novel Fluorinated Alcohols", Ser. No. 721,089, filed Apr. 12, 1968, now abandoned.

2. Copending application of Anello et al., entitled "Telomers and Process for the Preparation Thereof", Ser. No. 633,359, filed Apr. 25, 1967, now U.S. Pat. No. 3,514,487.

BACKGROUND OF THE INVENTION

A variety of polyfluoroalkyl phosphate esters are known to have surface-active and oil and stain repellent properties. See, for example U.S. Pat. Nos. 2,597,702; 3,083,224 and 3,096,207.

The present invention is directed to a novel class of polyfluoroalkyl phosphate esters, specifically the phosphate esters of $\omega$-polyfluoroisoalkoxy alkyl alcohols which exhibit unexpectedly high oil and grease repellency. These particular phosphate esters have not been suggested in the prior art.

SUMMARY OF THE INVENTION

The novel phosphate esters of the invention have the formula

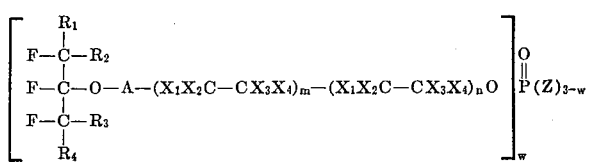

wherein a. $R_1$, $R_2$, $R_3$ and $R_4$ are independently fluorine, chlorine, alkyl or haloalkyl groups of one to 10 carbon atoms, preferably one to three carbon atoms, or when taken together may form a cycloalkyl or halocycloalkyl structure, and the halogens of the haloalkyl and cyclohaloalkyl groups are fluorine, chlorine, or bromine; with the proviso that no more than two of the $R_1$–$R_4$ groups are alkyl groups and no more than three of the $R_1$–$R_4$ groups are haloalkyl groups, preferably $R_1$–$R_4$ are fluorine or perfluoroalkyl groups;

b. A is a radical of the formula $-(CFR_5CR_6R_7)-$ in which $R_5$ and $R_6$ are independently fluorine or hydrogen, and $R_7$ is selected from the group consisting of hydrogen, fluorine, chlorine, bromine and perfluoro alkyl of one to eight carbon atoms; preferably $R_7$ is fluorine or chlorine, most preferably fluorine;

c. $X_1$, $X_2$, $X_3$ and $X_4$ may each be independently selected from the group consisting of hydrogen, fluorine, chlorine and bromine, provided that each $X_1$–$X_4$ group does not include more than two chlorine atoms or one bromine atom and when $X_1$ and $X_3$ are each hydrogen or fluorine, each of $X_2$ and $X_4$ may be $CF_2R_8$ wherein $R_8$ is an alkyl radical of one to eight carbon atoms or a haloalkyl radical of one to eight carbon atoms in which the halogen atoms are fluorine, chlorine or bromine; the $-(X_1X_2C-CX_3X_4)_m-$ and $-(X_1X_2C-CX_3X_4)_n-$ moieties may be the same or different; with the proviso that in the $-(X_1X_2C-CX_3X_4)$ moiety the terminal carbon atom, which is bonded to P through O, is additionally bonded to two hydrogen atoms. Preferably the halogens of $X_1$–$X_4$ are fluorine or chlorine, most preferably fluorine;

d. Z is a radical selected from the group consisting of chlorine; hydroxy; amino or substituted amino of the formula

wherein $R_9$ and $R_{10}$ are independently hydrogen, hydrocarbyl or hydroxy-substituted hydrocarbyl; and OY, wherein Y is independently hydrocarbyl, hydroxy-substituted hydrocarbyl, or water solubilizing cationic ion; with the proviso that Z cannot contain more than 18 carbon atoms, preferably Z cannot contain more than 52 nine carbon atoms;

e. $m$ is an integer from 1 to 10 preferably from 1 to 7, $n$ is an integer from 0 to 10, preferably from 0 to 7;

f. $w$ is an integer from 1 to 3, preferably $w$ is a number having an average value of 1 to about 2.5.

As used in this specification and in the appended claims the terms "hydrocarbyl" and "hydroxy-substituted hydrocarbyl" refer to organic radicals comprising only carbon and hydrogen atoms and to their mono and polyhydroxy substituted derivatives; said radicals being selected from the group consisting of alkyl, cycloalkyl, alkenyl, cycloalkenyl, aryl, aralkyl, aralkenyl, alkaryl and alkenylaryl.

The term "water solubilizing cationic ion" is an art recognized term, as found in U.S. Pat. Nos. 3,188,340 and 3,096,207, and refers to those cationic ions derived from water-soluble ionic compounds. The term includes, for example, ions of alkali metals and ammonium or substituted ammonium of the formula

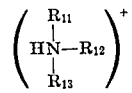

wherein $R_{11}$, $R_{12}$ and $R_{13}$ are independently hydrogen, hydrocarbyl or hydroxy-substituted hydrocarbyl, or $R_{11}$ and $R_{12}$ may be connected together, directly or through an intervening oxygen atom, to form a cyclic structure.

The criticality in the structure of these compounds is in the polyhaloisoalkoxyalkyl tail portion of the molecule wherein an ether atom links a fluorinated carbon atom having two haloalkyl groups to a carbon atom having at least one fluorine atom.

It has been found that the novel compounds of the invention can impart surface-active and oil and stain repellent properties to such materials as textiles, wood, paper and leather, as well as to articles prepared from these materials. They are especially valuable for external or internal sizing of paper. As used in this disclosure sizing means reducing the penetration of paper by various materials, particularly by oils and greases. The novel compounds may also be incorporated in paper as release agents, thus allowing adhesive materials to be readily removed from the paper's surface without damaging the paper.

In addition, the novel compounds of this invention may be applied to metals to impart resistance to corrosion and chemical attack, and may be used as emulsifying agents for other fluorochemicals.

DETAILED DESCRIPTION

The compounds of the invention may be prepared by any of several conventional ways. In one method, the corresponding alcohol, having the formula

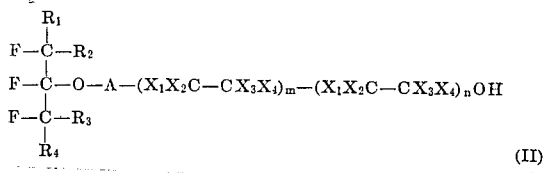

wherein $R_1$, $R_2$, $R_3$, $R_4$, $X_1$, $X_2$, $X_3$, $X_4$, A, $m$ and $n$ are as defined above, is reacted with phosphorous oxychloride in the presence of a tertiary amine acid acceptor such as pyridine or trimethylamine in the optional presence of an organic liquid as diluent such as ether, benzene or toluene. The reagents are initially brought into contact at 0° to 25° C. and the reaction mixture is then heated at a reflux temperature of about 50° to about 150° C. By varying the ratios of the reactants, the relative amount of mono-ester, di-ester and tri-ester produced can be affected. The novel phosphorochloridate product of the reaction can then be reacted with an amine or an alcohol to form the corresponding amide or ester; or the phosphochloridate can be hydrolyzed to the free acid, which may then be converted to the desired salt by reaction with an appropriate base such as alkali, ammonia or substituted ammonia. The optimum conditions for the above reactions involving the phosphochloridate product will vary with the particular reaction and may easily be determined by one skilled in the art.

In another method, the polyfluoroalkyl alcohol described may be reacted with phosphorous pentoxide to yield the novel free acids of the invention. For this reaction preferably about 3 moles of the alcohol are mixed with 1 mole of the pentoxide and the mixture is heated between 30° and 200° C. without the use of a solvent or base. The free acids may then be further reacted as described above.

The alcohols described in formula (II) above can be prepared by the methods disclosed in copending U.S. application, Ser. No. 721,089 filed Apr. 12, 1968, the pertinent subject matter of which is hereby incorporated by reference. Essentially the alcohol starting material may be prepared from the corresponding telomers of the formula

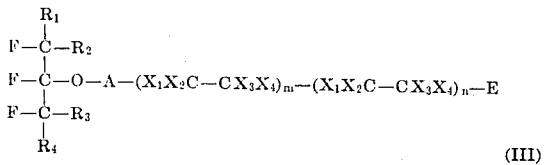

by reaction with $SO_3$ to produce the corresponding acid halide, reacting the acid halide with an alkanol at temperatures in the range of about 0°–25° C. to form the corresponding ester, followed by reduction of the ester with a mild reducing agent such as $LiAlH_4$ in ether to form the desired alcohol. In formula (III) $R_1$–$R_4$, A, $X_1$, $X_2$, $X_3$, $X_4$, $m$ and $n$ are as defined above and E is iodine or bromine, except that the terminal carbon atom adjacent to the E atom is perhalogenated.

Another generalized route to these alcohols is to react the corresponding telomer as described above, except that the terminal carbon atom adjacent to the E atom contains one or more hydrogen atoms, an alkyl group, an alkylene group, a haloalkyl group or a haloalkylene group, with $SO_3$ to form the corresponding polysulfates, followed by hydrolysis of the polysulfate with 35 – 50% $H_2SO_4$ at about 100° C. to the desired alcohol.

The telomer materials for these reactions, and preparation thereof, are disclosed in co-pending application, Ser. No. 633,359, filed Apr. 25, 1967, the pertinent subject matter of which is hereby incorporated by reference. Essentially, these telomer materials may be prepared by telomerizing corresponding telogens of the formula

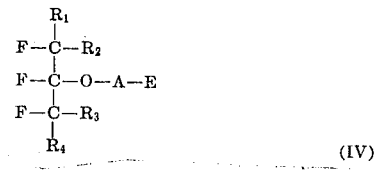

wherein $R_1$, $R_2$, $R_3$ and $R_4$ and A are as indicated above and wherein E is selected from the group consisting of iodine and bromine. When E is bromine, there may not be any other bromine substituents in the molecule. The reaction of the telogens of formula (IV) with a suitable telomerizable unsaturated material will give repeating units of the radical $—(X_1X_2C-CX_3X_4)—$ in the molecule.

The telomerization reaction is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100° and 350° C., preferably between about 150°–200° C. Furthermore, although the reaction may be conducted at atmospheric pressure, superatmospheric pressures, for example, up to about 20,000 p.s.i.g. may be used with pressures between about 100 p.s.i.g. and about 10,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of tetrafluoroethylene is used, for example, the reaction time is dependent on temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour to about 48 hours.

If desired, the telomerization reaction may be conducted by use of a catalyst or light of sufficient intensity to initiate the free radical reaction. Illustrative free radical generating catalysts include azonitriles such as alpha, alpha'-azobisisobutyronitrile and organic peroxides such as benzoyl peroxide, acetyl peroxide and pelargonyl peroxide. The use of such initiators allows operation at a lower temperature but gives a somewhat more complex product mixture because of incorporation of catalyst fragments in the telomer mixture, or results in a higher molecular weight distribution in the telomer product.

The telomerization reaction may be carried out in various ways. For example, the telogen and the unsaturated compound may be introduced into an autoclave which is then sealed and heated, preferably with agitation such as by stirring or shaking, until the pressure drop indicates that the reaction has proceeded to the desired extent. In such an operation, the molar ratio of unsaturated compound to telogen is of importance in determining the molecular weight of the telomer product. In general, the average molecular weight of the product is dependent upon the molar ratio of unsaturated compound to telogen; the higher the unsaturated compound:telogen molar ratio, the higher will be the average molecular weight of the telomer product. The ratio of telogen to unsaturated compound may vary from about 1:75 to as high as 200:1, the preferred ratio for batchwise operation being about 1:1 to 2:1 in the production of relatively low molecular weight telomers, i.e. telomers containing up to about 6 or 7 monomer units per telomer molecule. On the other hand, in a constant pressure reaction, i.e. where a constant pressure of unsaturated compound is maintained above the liquid phase comprising the telogen during the reaction, the molecular weight of telomer product may be controlled by varying the pressure of the unsaturated compound. In general, the higher the pressure of the unsaturated compound, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties.

The telogen starting materials may be prepared by reaction of an appropriate halogenated ketone with an ionizable fluoride salt to form a fluorinated organic salt and then reacting the organic salt with a halogen other than fluorine (e.g. iodine, bromine) and an appropriate olefin to form the desired telogen. This reaction is more fully described in co-pending applications of Litt et al., Ser. No. 492,276, filed Oct. 1, 1965 now U.S. Pat. No. 3,453,333 and Litt et al., Ser. No. 513,574, now U.S. Pat No. 3,470,256 filed Dec. 13, 1965, the pertinent subject matter of which is hereby incorporated by reference. For example, as is described in Examples 1 and 3 of the former application, the telogen perfluoroisopropoxyethyl iodide, $(CF_3)_2CFOCF_2CF_2I$, may be prepared by reacting hexafluoroacetone with potassium fluoride in an acetonitrile solvent to produce the corresponding addition compound having the formula $(CF_3)_2CFO^-K^+$ and thereafter reacting this addition compound with tetrafluoroethylene and iodine in the presence of an inert organic solvent to form the desired perfluoroisopropxyethyl iodide, $(CF_3)_2CFOCF_2CF_2I$.

Telomers according to formula (III) wherein $n$ is 0 may be obtained by telomerizing a telogen of formula (IV) with a telomerizable unsaturated compound. The telomerizable unsaturated compound may be the same or different from that used as reactant with the fluorinated organic salt and halogen in preparation of the telogen starting materials. Telomers according to formula (III) wherein both $m$ and $n$ are 1 or over, may be obtained by reacting a suitable telogen with a first telomerizable unsaturated material to form a telomer and then reacting the telomer thus produced with a second telomerizable unsaturated material which may be the same or different as the first telomerizable unsaturated material. The telomerizable unsaturated compound may not contain bromine if the E atom in the telogen is bromine.

As can be seen from the above description, the telomers produced can serve as telogens for further reactions. The term telogen will be used in this sense herein. In other words, the telogen may be a telomer product produced from the telogen, which telomer produced is further telomerizable.

Preferred telomerizable unsaturated materials are selected from the group consisting of $CF_2=CF_2$, $CF_2=CH_{bt}$, $CF_2=CClF$, $CF_3CF=CF_2$ and $CH_2=CH_2$. Other suitable telomerizable unsaturated materials include the following: $CCl_2=CH_2$, $CFH=CH_2$, $CClH=CH_2$ $CFH=CF_2$, $CFH=CFH$, $CClH—CClH$, $CF_2CFBr$, $CF_2ClCF=CH_2$, $CF_2CH=CF_2$ $CF_3CCl=CF_2$, $(CF_3)_2C=CF_2$, $CF_3CF=CFCl$, $CF_3CH=CFCl$, $CFCl=CFCl$, $CF_3CF=CF_2$, $CF_2ClCF=CF_2$, $CF_2BrCF=CF_2$, $CF_3CF=CFCF_3$, $CHF=CFCFCl_2$, $CHF=CFCF_3$, $CF_2=CF(CH_2)_6CH_3$, $CF_2=CFCHClCH_3$, $CF_2=CHCF_2CH_3$, $CF_2=CHCF_2CHCF_2CH_2Cl$, $CH_2=CCF_3CF_2Br$, $CF_2=C(CF_3)CF_2(C_3H_7)$, $CHCl=CFCF_3$, $CH_2=CClCF_2CH_3$.

Many more suitable telomerizable unsaturated compounds subject to the restrictions of the definition for the compounds of formula (II) given above, will readily occur to one of ordinary skill in the art.

DESCRIPTION OF THE PREFERRED EMBODIMENTS

A preferred class of phosphate esters within the scope of the invention is that which has the formula

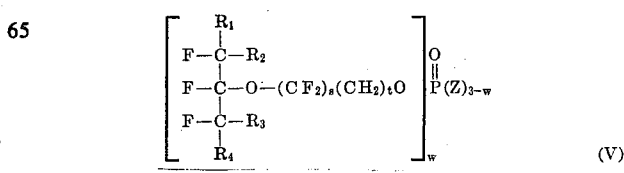

(V)

wherein a. Z and w are as defined above.

b. $R_1$, $R_2$, $R_3$ and $R_4$ are independently fluorine or perhaloalkyl groups having from one to 10 carbon atoms, preferably from one to three carbon atoms, in which all the halogen atoms are independently selected from the group consisting of chlorine and fluorine, with the proviso that at least one fluorine atom is attached to each carbon atom of the $R_1$-$R_4$ groups.

c. s and t are integers from 1 to 20, preferably from 1 to 14; most preferably s is from 2 to 8 and t is from 1 to 11.

A more preferred class of phosphate esters is that in which $R_1$-$R_4$ are independently fluorine or perfluoroalkyl. Most preferred is when $R_1$-$R_4$ are each fluorine and Z is chlorine, hydroxy, or OY wherein Y is ammonium or hydroxyalkyl-substituted ammonium. Illustrative of the most preferred class are the following phosphate esters:

[$(CF_3)_2CFO(CF_2)_2(CH_2)_2O]_2POCl$
[$(CF_3)_2CFO(CF_2)_4(CH_2)_2O]_2POCl$
[$(CF_3)_2CFO(CF_2)_6(CH_2)_2O]_2POCl$
[$(CF_3)_2CFO(CF_2)_8(CH_2)_2O]_2POCl$
[$(CF_3)_2CFO(CF_2)_2(CH_2)_2O]_2PO(ONH_4)$
[$(CF_3)_2CFO(CF_2)_4(CH_2)_2O]_2PO(ONH_4)$
[$(CF_3)_2CFO(CF_2)_6(CH_2)_2O]_2PO(ONH_4)$
[$(CF_3)_2CFO(CF_2)_8(CH_2)_2O]_2PO(ONH_4)$
[$(CF_3)_2CFO(CF_2)_2(CH_2)_2O]_2POONH_2(CH_2CH_2OH)_2$
[$(CF_3)_2CFO(CF_2)_4(CH_2)_2O]_2POONH_2(CH_2CH_2OH)_2$
[$(CF_3)_2CFO(CF_2)_6(CH_2)_2O]_2POONH_2(CH_2CH_2OH)_2$
[$(CF_3)_2CFO(CF_2)_8(CH_2)_2O]_2POONH_2(CH_2CH_2OH)_2$
[$(CF_3)_2CFO(CF_2)_2(CH_2)_2O]_2POOH$
[$(CF_3)_2CFO(CF_2)_4(CH_2)_2O]_2POOH$
[$(CF_3)_2CFO(CF_2)_6(CH_2)_2O]_2POOH$
[$(CF_3)_2CFO(CF_2)_8(CH_2)_2O]_2POOH$
[$(CF_3)_2CFO(CF_2)_2(CH_2)_{11}O]POOH$
[$(CF_3)_2CFO(CF_2)_4(CH_2)_{11}O]POOH$
[$(CF_3)_2CFO(CF_2)_6(CH_2)_{11}O]POOH$
[$(CF_3)_2CFO(CF_2)_8(CH_2)_{11}O]POOH$
[$(CF_3)_2CFOCF_2CH_2O]_2POOH$
[$(CF_3)_2CFO(CF_2)_3CH_2O]_2POOH$
[$(CF_3)_2CFO(CF_2)_5CH_2O]_2POOH$
[$(CF_3)_2CFO(CF_2)_7CH_2O]_2POOH$
[$(CF_3)_2CFO(CF_2)_9CH_2O]_2POOH$

Depending upon whether the values of s and t in the above formula (V) are to be odd or even and upon the length of the various $CF_2$ and $CH_2$ chains, the preferred routes to the alcohol starting materials will vary. Preferred routes are as follows:

1. When s in formula (V) is to be an odd number from 1 to 19 inclusive and t is to be 1, the alcohols can be prepared by reacting the perhaloisoalkoxy alkyl iodide wherein s is an even number from 2 to 20, and t is zero, i.e.

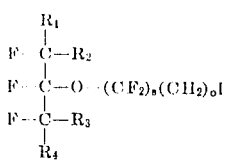

with $SO_3$ to form a mixture of the acyl fluoride and the perhalo alkoxy fluoroalkyl pyrosulfuryl fluoride, reacting the combined reaction products with an alcohol such as methanol, ethanol and the like to produce the ester, and reducing the ester to the alcohol with lithium aluminum hydride ($LiAlH_4$) as a reducing agent.

2. When s is an even number from 2–20 and t is 1, the alcohol may be prepared by treating the iodide of a compound having the desired final number of —$CF_2$— groups and two —$CH_2$— groups with alcoholic KOH to remove the iodine and form the perhaloisoalkoxy fluoroalkyl ethene, oxidizing the ethene with $KMnO_4$ to the acid, converting the acid to a lower alkyl ester and reducing the ester to the alcohol with lithium aluminum hydride.

3. When s is an even number from 2 to 20, and t is an odd or even number from 3 to 20, the alcohol may be produced by reduction of the corresponding iodo alcohol of the formula

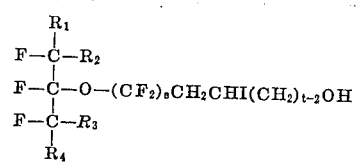

with lithium aluminum hydride ($LiAlH_4$) or with zinc and alcohol. The production of such iodo alcohols may be effected by reacting a perhaloisopropoxy fluoroalkyl iodide having s $CF_2$ groups in the alkyl chain with an w-olefinic alcohol having t-2 $CH_2$ groups in the chain attached to the terminal OH group.

4. When s is an odd number from 1 to 19 and t is an even or odd number from 3 to 20, the resulting alcohols can be prepared by reacting a perhaloisoalkoxy alkanoic acid of the formula

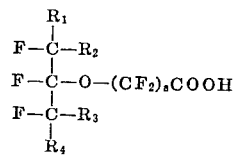

with silver oxide and then with elemental iodine to form the perhaloisoalkoxy perfluoroalkyl iodide, then reacting the perhaloisoalkoxy perfluoroalkyl iodide with an unsaturated alcohol such as allyl alcohol, and removing the iodine as with zinc and alcohol.

5 and 6. When s is an even number from 2 to 20 and t is 1 to 3 the alcohols can be made by converting the appropriate iodide of the formula

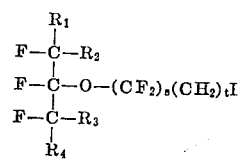

to the pyrosulfate with $SO_3$ or to the hydro sulfate with oleum, and then hydrolyzing the fluoroalkoxy dialkyl pyrosulfate or hydrogen sulfate to the alcohol with aqueous acid.

7. When alcohols with an odd number of —$CF_2$— groups are desired, these can be obtained by reacting a perhaloisoalkoxy perfluoroalkyl iodide having an even number, $s+1$, of $-CF_2-$ groups, with $SO_3$, esterifying the resulting reaction products, reducing the ester to the alcohol with $LiAlH_4$ as reducing agent and reacting the alcohol with p-toluene sulfonyl chloride and metallic iodide to form the iodide containing $s$ ($CF_2$) and one $CH_2$ group.

A preferred class of phosphate esters is when $w=2$. However, inasmuch as the synthesis of the phosphates results in a mixture of phosphates of different degrees of esterification, and thus conventional separation methods must be employed to obtain the preferred class of esters, mixtures of phosphate esters in which a major portion of the ester molecules have a $w$ value of 2 constitute the most desirable product for practical use.

The preferred water solubilizing cationic ions are alkali metals such as sodium, potassium and lithium, ammonium; alkyl substituted ammonium such as methylammonium, ethylammonium, diethylammonium, triethylammonium, n-propylammonium, methyldiethylammonium, and the like; hydroxyalkyl-substituted ammoniums such as ethanolammonium, diethanolammonium, triethanolammonium, bis(3-hydroxypropyl)ammonium and the like; cycloalkyl-substituted ammoniums such as cyclohexylammonium, methylcyclohexylammonium and the like; aryl substituted ammoniums such as phenyl ammonium, benzylammonium and the like; and heterocyclic ammoniums such as pyridinium, morpholinium and the like.

Specific examples of embodiments of the novel compounds of the invention as defined both by formula (I) and formula (V) include the following:

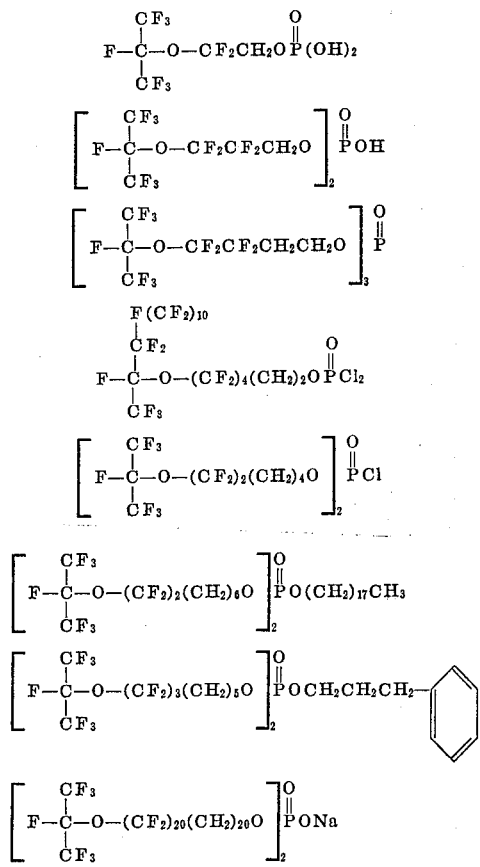

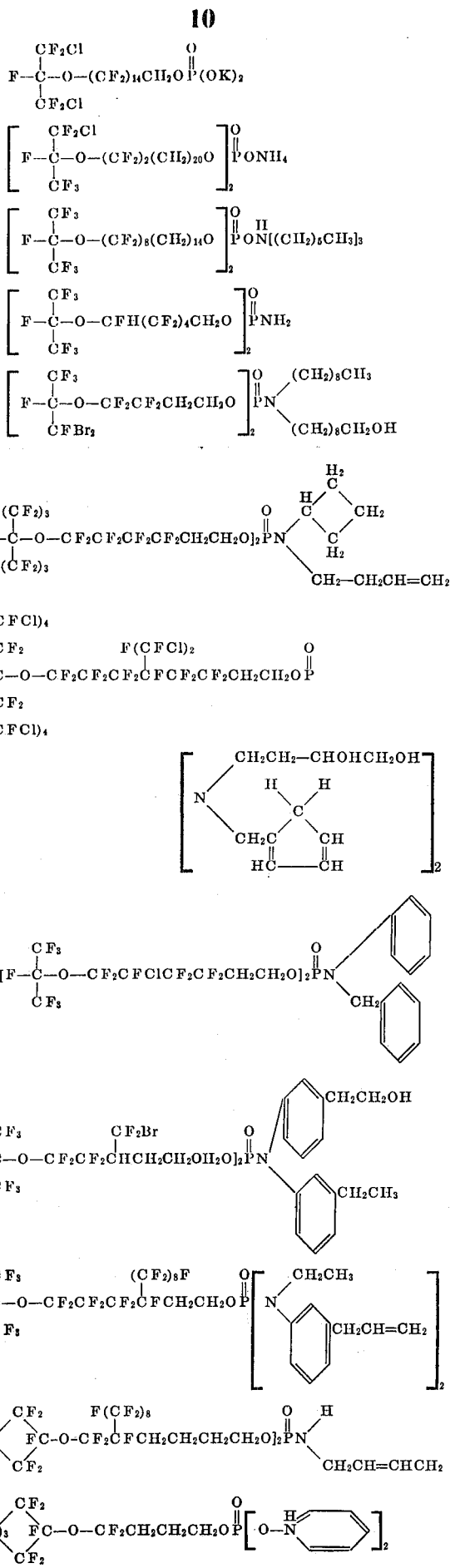

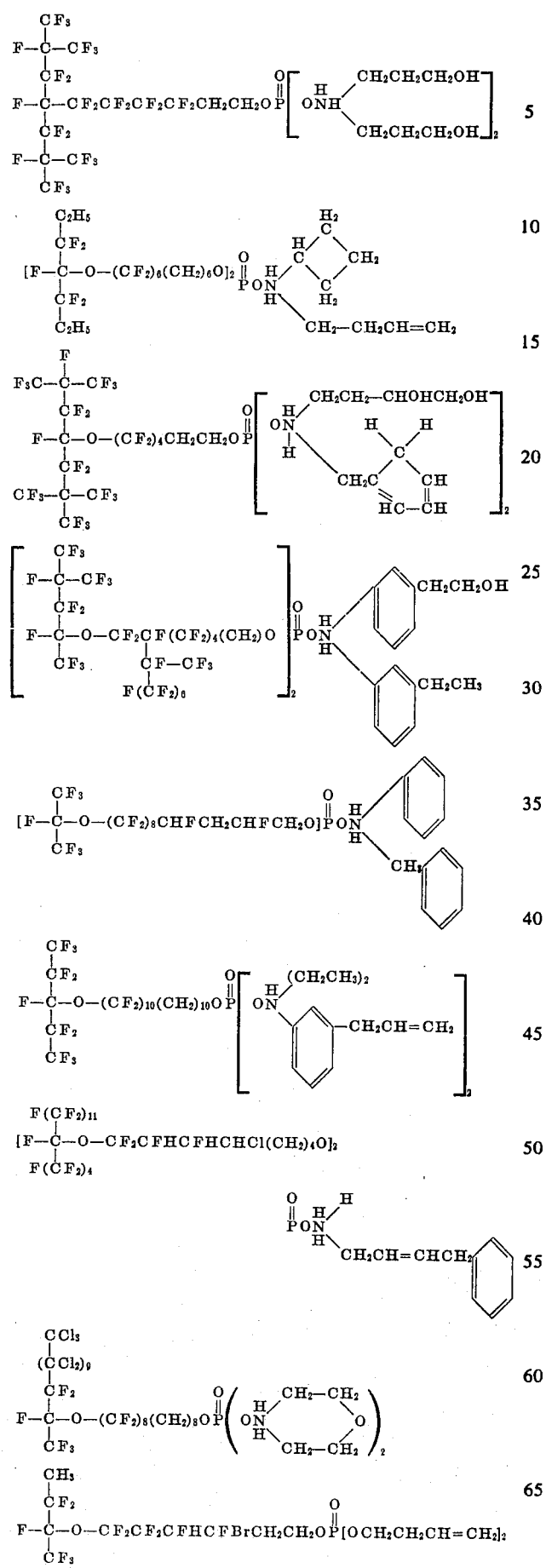

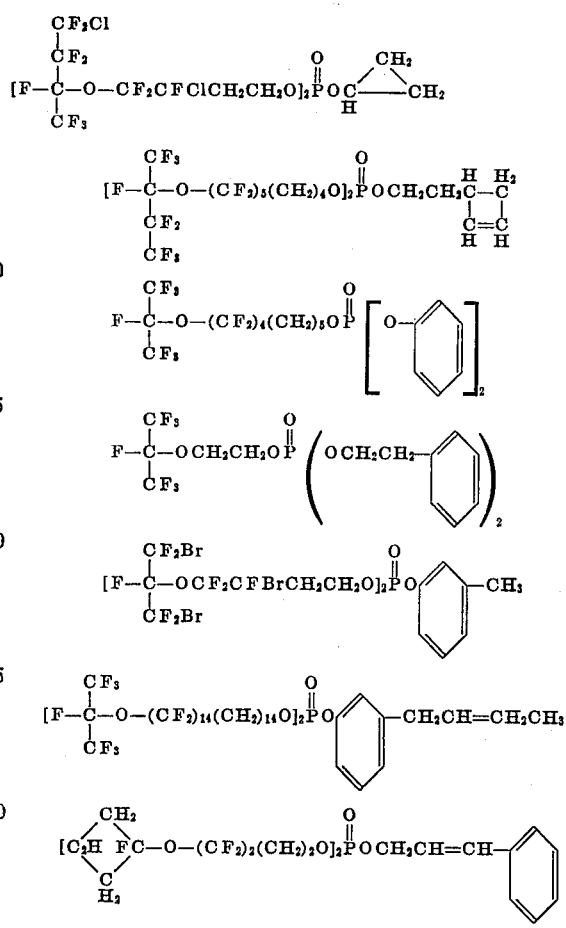

The invention can be more fully understood by reference to the following examples. Analyses are in percent by weight.

EXAMPLE 1

Preparation of Ammonium Bis [4-heptafluoroisopropoxy-3,3,4,4-tetrafluorobutyl] Phosphate.

A solution of 50.0g (0.152 mole) of 4-heptafluoroisopropoxy-3,3,4,4-tetrafluorobutanol and 6.0g (0.075 mole) of pyridine in 65g of anhydrous diethyl ether was slowly added to an agitated solution of 11.5g (0.075 mole) of phosphorous oxychloride in 85g of diethyl ether containing 6.0g (0.075 mole) of pyridine maintained at 15°–20° C. The reaction mixture was refluxed for 4 hours at 37° C., filtered, and the filtrate concentrated. There was recovered 47.6g of bis[4-heptafluoroisopropoxy-3,3,4,4-tetrafluorobutyl] phosphochloridate:

[(CF$_3$)$_2$CFOCF$_2$CF$_2$CH$_2$CH$_2$O]$_2$POCl

Analysis for C$_{14}$H$_8$F$_{22}$ClPO$_5$:
Calculated: C, 22.68; H, 1.08; F, 56.57; P, 4.18.
Found: C, 22.70; H, 1.05; F, 57.02; P, 3.98.

The phosphochloridate thus obtained (41.6g) was heated with 5.0g of pyridine and 6.5 g of water to 100° C. for 2 hours. After the mixture cooled, 10g of dilute hydrochloric acid was added with agitation. The organic layer was extracted with ether, separated, washed with water, dried and stripped of ether and other volatiles. There was recovered 40.5g of bis[4-heptafluoroisopropoxy-3,3,4,4-tetrafluorobutyl]hydrogen phosphate:

[(CF$_2$)$_2$CFOCF$_2$CF$_2$CH$_2$CH$_2$O]$_2$POOH
Analysis for C$_{14}$H$_9$F$_{22}$O$_6$P:
Calculated: C, 23.27; H, 1.24; F, 57.92.
Found: C, 24.02; H, 1.29; F, 56.95.

The hydrogen phosphate thus obtained (38g) was dissolved in 35g of dry ether, and the solution was treated with ammonia gas at about 35° C. for about 5 hours. The ammonium bis[4-heptafluoroisopropoxy-3,3,4,4-tetrafluorobutyl]phosphate was precipitated as a white crystalline solid. Melting point was 115°–120° C.

[(CF$_3$)$_2$CFOCF$_2$CF$_2$CH$_2$CH$_2$O]$_2$PO(ONH$_4$)
Analysis for C$_{14}$H$_{12}$F$_{22}$NPO$_6$:
Calculated: C, 22.70; H, 1.62; F, 56.57; N, 1.89
Found: C, 22.82; H, 1.65; F, 57.12; N, 1.98

EXAMPLE 2

Preparation of Diammonium 4-heptafluoroisopropoxy-3,3,4,4-tetrafluorobutyl Phosphate.

A solution of 100g (0.30 mole) of 4-heptafluoroisopropoxy-3,3,4,4-tetrafluorobutanol and 12.0g (0.15 mole) of pyridine in 130g of anhydrous diethyl ether was slowly added to an agitated solution of 46.0g (0.30 mole) of phosphorous oxychloride in 170g of ether containing 12.0g (0.15 mole) of pyridine and maintained at 15°–20° C. The reaction mixture was refluxed at 37° C. for 3 hours filtered and the filtrate concentrated. There was recovered 109g of 4-heptafluoroisopropoxy-3,3,4,4-tetrafluorobutylphosphoryl dichloride:

(CF$_3$)$_2$CFOCF$_2$CF$_2$CH$_2$CH$_2$OPOCl$_2$
Analysis for C$_7$H$_4$F$_{11}$Cl$_2$PO$_3$:
Calculated: C, 18.76; H, 0.89; F, 46.75; P, 6.43.
Found: C, 19.25; H, 1.24; F, 47.50; P, 6.20

The phosphoryldichloride (98g) was heated with 40g of pyridine and 36g of water at 80° C. for 2 hours. After the mixture cooled, 50g of dilute hydrochloric acid was added with agitation. The organic layer was extracted with ether, separated, washed with water, dried, and stripped of ether and other volatiles. There was recovered 57g of 4-heptafluoroisopropoxy-3,3,4,-4-tetrafluorobutyl dihydrogen phosphate:

(CF$_2$)$_2$CFOCF$_2$CF$_2$CH$_2$CH$_2$OPO(OH)$_2$
Analysis for C$_7$H$_6$F$_{11}$PO$_5$:
Calculated: C, 20.48; H, 1.46; F, 50.97; P, 7.55
Found: C, 21.12; H, 1.54; F, 51.61; P, 7.68.

The dihydrogen phosphate thus obtained (15g) was dissolved in 150g of anhydrous ether and the solution was treated with ammonia gas for 3 hours. The diammonium 4-heptafluoroisopropoxy-3,3,4,4-tetrafluorobutyl phosphate: (CF$_3$)$_2$CFOCF$_2$CF$_2$CH$_2$—CH$_2$OPO(ONH$_4$)$_2$ precipitated as a white crystalline solid and was filtered off.

Melting Point: 180°–185° C.
Analysis for C$_7$H$_{12}$F$_{11}$N$_2$PO$_5$:
Calculated: C, 18.91; H, 2.70; F, 47.29; P, 6.98.
Found: C, 19.29; H, 2.17; F, 48.12; P, 6.85.

EXAMPLE 3

Preparation of Ammonium Bis(8-heptafluoroisopropoxy-3,3, to 8,8-dodecafluorooctyl) Phosphate.

Using the procedure of Example 1,8-heptafluoroisopropoxy-3,3 to 8,8dodecafluorooctanol was reacted with phosphorous oxychloride in the presence of pyridine to yield bis(8-heptafluoroisopropoxy-3,3, to 8,8-dodecafluorooctyl) phosphochloridate. Hydrolysis yielded bis(8-Heptafluoroisopropoxy-3,3, to 8,8-dodecafluorooctyl hydrogen phosphate. This product was treated with ammonia gas to form ammonium bis(8-heptafluoroisopropoxy-3,3, to 8,8-dodecafluorooctyl phosphate.

Melting Point: 175°–180° C,:
[(CF$_3$)$_2$CFO(CF$_2$CF$_2$)$_3$CH$_2$CH$_2$O]$_2$PO(ONH$_4$)
Analysis for C$_{22}$H$_{12}$F$_{38}$NPO$_6$:
Calculated: C, 23.20; H, 1.06; F, 63.28; P, 2.72
Found: C, 24.12; H, 1.15; F, 64.97; P, 2.92.

EXAMPLE 4

Preparation of Ammonium Bis[13-heptafluoroisopropoxy-12,12,13,13-tetrafluorotridecyl]phosphate.

Using the procedure of Example 1, 13-heptafluoroisopropoxy-12,12,13,13-tetrafluorotridecanol was reacted with phosphorous oxychloride in the presence of pyridine to yield bis(13-heptafluoroisopropoxy-12,12,13,13-tetrafluorotridecyl)phosphochloridate. Hydrolysis yielded bis[13-heptafluoroisopropoxy-12,12,13,-tetrafluorotridecyl]hydrogen phosphate. This product was treated with ammonia gas to form Ammonium bis(13heptafluoroisopropoxy-12,12,13,13-tetrafluorotridecyl)phosphate, a grease-like material:

[(CF$_3$)$_2$CFOCF$_2$CF$_2$(CH$_2$)$_{11}$O]$_2$PO(ONH$_4$)
Analysis for C$_{32}$F$_{22}$H$_{48}$NPO$_6$:
Calculated: C, 38.7; H, 4.88; N, 1.42.
Found: C, 37.5; H, 4.75; N, 1.92.

EXAMPLE 5

Preparation of Diammonium [13-heptafluoroisoproxy-12,12,13,13-tetrafluorotridecyl]phosphate.

Using the procedure of Example II, 13-heptafluoroisopropoxy-12,12,13,13-tetrafluorotridecanol was reacted with phosphorous -heptafluoroisoproxy-in the presence of pyridine to yield 13-heptafluoroisopropoxy-12,12,13,13-tetrafluorotridecyl phosphoryl dichloride. Hydrolysis yielded 13-heptafluoroisopropoxy-12,12,13,13-tetrafluorotridecyl hydrogen phosphate. The product was treated with ammonia gas to yield diammonium (13-heptafluoroisopropoxy-12,12,13,13-tetrafluorotridecyl) phosphate.

Melting Point: 205°–210° C:
(CF$_3$)$_2$CFOCF$_2$CF$_2$(CH$_2$)$_{11}$OPO(ONH$_4$)$_2$
Analysis for C$_{20}$F$_{19}$H$_{30}$O$_5$N$_2$P:
Calculated: C, 31.2; H, 3.92; N, 3.64.
Found: C, 31.1; H, 3.47; N, 3.10.

EXAMPLE 6

Preparation of Diammonium 17-heptafluoroisopropoxy-12-12, to 17,17-dodecafluoroheptadecyl phosphate.

Using the procedure of Example 2, 17-heptafluoroisopropoxy-12,12, to 17,17-dodecafluoroheptadecanol was reacted with phosphorous oxychloride in the presence of pyridine to yield 17-heptafluoroisopropoxy-12,12, to 17,17-dodecafluoroheptadecylphosphoryldichloride. A benzene solution of the phosphoryldichloride was treated with the calculated amount of pyridine and an excess of water at 60° for 2 hours. The liquid phase was decanted off and the dihydrogen phosphate was washed with water, and dried by azeotroping with benzene. Ammonia gas was then bubbled into the boiling benzene for 2 hours, which yielded diammonium 17-heptafluoroisopropoxy-12,12 to 17,17-dodecafluoroheptadecyl phosphate.

Melting Point 175°–210°C.

$(CF_3)_2CFO(CF_2CF_2)_3(CH_2)_{11}OPO(ONH_4)_2$

Analysis for $C_{20}F_{19}H_{30}O_5N_2P$:

Calculated: C, 31.2; H, 3.92; N, 3.64

Found: C, 31.8; H, 3.57; N, 3.24.

EXAMPLE 7

Preparation of Ammonium bis (19-heptafluoroisopropoxy-12,12, to 19,19-hexadecafluorononadecyl)phosphate.

Using the procedure of Example 1, 19-heptafluoroisopropoxy, 12,12 to 19,19-hexadecafluorononadecanol was reacted with phosphorous oxychloride in the presence of pyridine to yield bis-(19-heptafluoroisopropoxy-12,12 to 19,19-hexadecafluorononadecyl) phosphochloridate. Hydrolysis yielded bis(19-heptafluoroisopropoxy 12,12- to 19,19-hexadecafluorononadecyl)hydrogen phosphate. This product was treated with ammonia gas to form ammonium bis-(19-heptafluoroisopropoxy-12,12 to 19,19-hexadecafluorononadecyl)phosphate.

Melting Point: 150°–175°C.

$[(CF_3)_2CFO(CF_2CF_2)_4(CH_2)_{11}O]_2POONH_4$

Analysis for $C_{44}F_{46}H_{48}O_6PN$

Calculated: C, 33.1; H, 3.1; N, 0.88

Found: C, 32.8; H, 2.8; N, 0.99

EXAMPLE 8

Preparation of Diammonium 19-heptafluoroisopropoxy-12,12, to 19,19-hexadecafluorononadecyl phosphate.

Using the procedure of Example 6, 19-heptafluoroisopropoxy-12,12 to 19,19-hexadecafluorononadecanol was reacted with phosphorous oxychloride in the presence of pyridine to yield 19-heptafluoroisopropoxy-12,12 to 19,19-hexadecafluorononadecylphosphoryldichloride. A benzene solution of the phosphoryldichloride was treated with the calculated amount of pyridine and an excess of water at 60° for 2 hours. The liquid phase was decanted off and the dihydrogen phosphate was washed with water and dried by azeotroping with benzene. Ammonia gas was then bubbled into the boiling benzene for 2 hours, which yielded diammonium 19-heptafluoroisopropoxy-12,12, to 19,19-hexadecafluorononadecyl phosphate.

Melting Point: 200°–220° C.

$(CF_3)_2CFO(CF_2CF_2)_4(CH_2)_{11}OPO(ONH_4)_2$

Analysis for $C_{22}F_{23}H_{27}O_5PN_2$:

Calculated: C, 31.0; H, 3.16; N, 1.64.

Found: C, 32.0; H, 3.4; N, 1.74.

EXAMPLE 9

Internal Sizing of Paper

A 50:50 mixture of hardwood and softwood bleached kraft pulps was treated with varying amounts (based on the dry weight of the pulp) of ammonium bis[4-heptafluoroisopropoxy-3,3,4,4-tetrafluorobutyl]phosphate (Example 1) from aqueous solution. The pulp was slowly agitated for 3–5 minutes and 3.0 percent Cato-15 (a cationic starch — National Starch and Chemical Co.) based on the dry weight of the pulp was added. Hand sheets were formed and dried after further slow agitation of the furnish for 3–5 minutes. The hand sheets acquired excellent oil resistance as shown by results of the Kit Test in Table I below.

The Kit Test is a procedure for testing the degree of repellency of paper and board which are treated with fluorochemical-type sizing agents. The procedure is detailed in Tappi, Vol. 50, No. 10 (October, 1967). Essentially the test procedure involves the following:

1. Prepare the following 12 mixtures and store in glass stoppered bottles.

| Kit No. | Volume Castor Oil, Ml | Volume Toluene Ml | Volume Heptane, Ml |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

2. Obtain five representative specimens of the paper to be tested (at least 2 × 2 inches).

3. Place each test specimen test side up. Drop one drop of test solution from an intermediate kit number bottle. After exactly 15 seconds, remove the excess fluid and immediately examine the wetted area. Failure is evidenced by a pronounced darkening of the specimen, caused by penetration, under the drop. Repeat the procedure on new areas of the specimen with a drop from other kit number bottles.

4. The highest numbered solution that stands on the surface of the test specimen for 15 seconds without causing failure is the Kit Rating for that specimen. Report the average Kit Rating Number of the five specimens to the nearest whole number. Papers having a Kit Number of about 5 exhibit fair oil repellency, those having a Kit Number of 10 or above will have excellent oil repellency.

TABLE I

| Treatment | Size Applied | Kit Rating Number |
|---|---|---|
| Cured 1 hour at 110°C. and Std. conditioning | 2.0 | 12 |
| Cured 1 hour at 110°C. and Std. conditioning | 1.5 | 12 |
| Cured 1 hour at 110°C and Std. conditioning | 1.0 | 12 |
| Cured 1 hour at 110°C. and Std. conditioning | 0.5 | 12 |
| Cured 1 hour at 110°C. and Std. conditioning | 0.25 | 9 |

EXAMPLE 10

External Sizing of Paper.

Aqueous solutions or isopropanol-water solutions containing 0.5 weight % of the novel polyfluorophosphates were applied to hand sheets made from bleached hardwood and softwood pulps as a surface treatment. The handsheets were then dried at 115° C. for 10 minutes and cured at 110° C. for 1 hour. The sheets were evaluated without any conditioning using the Kit Test as described in Example 9. The test results are shown below in Table II. Untreated sheets have kit numbers of about 1-2.

TABLE II

| | Kit Rating Number |
|---|---|
| [(CF$_3$)$_2$CFO(CF$_2$)$_2$(CH$_2$)$_2$O]$_2$PO(ONH$_4$) | 12 |
| (CF$_3$)$_2$CFO(CF$_2$)$_2$(CH$_2$)$_2$OPO)ONH$_4$)$_2$ | 10 |
| [(CF$_3$)$_2$CFO(CF$_2$)$_2$(CH$_2$)$_{11}$O]$_2$PO(ONH$_4$) | 5 |
| (CF$_3$)$_2$CFO(CF$_2$)$_2$(CH$_2$)$_{11}$OPO(ONH$_4$)$_2$ | 9-10 |
| (CF$_3$)$_2$CFO(CF$_2$)$_6$(CH$_2$)$_{11}$OPO(ONH$_4$)$_2$ | 5-6 |
| (CF$_3$)$_2$CFO(CF$_2$)$_8$(CH$_2$)$_{11}$OPO(ONH$_4$)$_2$ | 8 |
| [(CF$_3$)$_2$CFO(CF$_2$)$_6$CH$_2$)$_{11}$O]$_2$PO(ONH$_4$) | 10 |
| (CF$_3$)$_2$CFO(CF$_2$)$_2$(CH$_2$)$_2$OPO(OH)$_2$ | 10 |

We claim:

1. 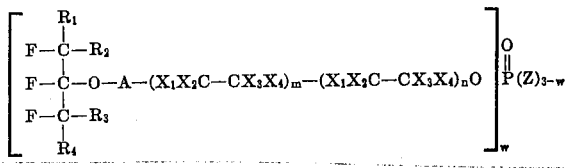

wherein
a. R$_1$, R$_2$, R$_3$ and R$_4$ are selected from the group consisting of fluorine, chlorine, alkyl groups of one to 10 carbon atoms and haloalkyl groups of one to 10 carbon atoms, or when taken together may form a cycloalkyl or halocycloalkyl structure; the halo portions being fluorine, chlorine or bromine, with the proviso that no more than two of the R$_1$-R$_4$ groups are alkyl groups and no more than three of the R$_1$-R$_4$ groups are haloalkyl groups;
b. A is a radical of the formula —(CFR$_5$—CR$_6$R$_7$)— in which R$_5$ and R$_6$ are independently fluorine or hydrogen, and R$_7$ is selected from the group consisting of hydrogen, fluorine, chlorine, bromine and perfluoro alkyl of one to eight carbon atoms;
c. X$_1$, X$_2$, X$_3$ and X$_4$ may each be independently selected from the group consisting of hydrogen, fluorine, chlorine and bromine, provided that X$_1$-X$_4$ do not include more than two chlorine atoms or one bromine atom and when X$_1$ and X$_3$ are each hydrogen or fluorine, each of X$_2$ and X$_4$ may be CF$_2$R$_8$ wherein R$_8$ is an alkyl radical of one to eight carbon atoms or in haloalkyl radical of one to eight carbon atoms in which the halogen atoms are fluorine, chlorine or bromine; the —(X$_1$X$_2$C—CX$_3$X$_4$)$_m$— and —(X$_1$X$_2$C—CX$_3$X$_4$)$_n$— moieties may be the same or different, with the proviso that in the —(X$_1$X$_2$C—CX$_3$X$_4$) moiety, the terminal carbon atom, which is bonded to P through O, is additionally bonded to two hydrogen atoms;
d. Z is a radical selected from the group consisting of chlorine, hydroxy and OY wherein Y is a water solubilizing cationic ion.

e. m is an integer from 1 to 10 and n is an integer from 0 to 10.
f. w is an integer from 1 to 3.

2. The phosphate ester of claim 1, wherein the —(X$_1$X$_2$C—CX$_3$X$_4$)— moieties are independently selected from the group consisting of —CF$_2$—CF$_2$—, CF$_2$—CH$_2$—, —CF$_2$—CClF—, and —CH$_2$CH$_2$—

3. The phosphate ester of claim 2, wherein said water solubilizing cationic ion is selected from the group consisting of alkali metal and ammonium.

4. The phosphate ester of claim 3, wherein said alkali metal is selected from the group consisting of sodium, potassium and lithium.

5. The phosphate ester of claim 4 wherein m is an integer from 1 to 7 and n is an integer from 0 to 7.

6. The phosphate ester of claim 5, wherein w is a number having an average value of from 1.0 to about 2.5.

7. The phosphate ester of claim 6, wherein a major portion of said phosphate ester molecules have a w value of 2.

8. The phosphate ester of claim 7, wherein all halogens are independently fluorine or chlorine.

9. The phosphate ester of claim 8 wherein R$_1$, R$_2$, R$_3$ and R$_4$ are selected from the group consisting of fluorine, chlorine and haloalkyl groups of one to three carbon atoms.

10. The phosphate ester of claim 9, wherein Z is OY, and Y is sodium or potassium.

11. The phosphate ester of claim 2, wherein Z is OY and Y is ammonium.

12. The phosphate ester of claim 2, wherein Z is hydroxy.

13. The phosphate ester of claim 2, wherein Z is chlorine.

14. A phosphate ester of the formula $$\left[ \begin{array}{c} R_1 \\ | \\ F-C-R_2 \\ | \\ F-C-O-(CF_2)_s(CH_2)_tO \\ | \\ F-C-R_3 \\ | \\ R_4 \end{array} \right]_w \begin{array}{c} O \\ || \\ P(Z)_{3-w} \end{array}$$

wherein
a. R$_1$, R$_2$, R$_3$ and R$_4$ are independently fluorine or perhaloalkyl groups of one to 10 carbon atoms, in which all the halogen atoms are independently chlorine or fluorine, with the proviso that at least one fluorine atom is attached to each carbon atom of the R$_1$-R$_4$ groups.
b. Z is a radical selected from the group consisting of chlorine, hydroxy and OY wherein Y is a water solubilizing cationic ion;
c. s and t are integers from 1 to 20.
d. w is an integer from 1 to 3.

15. The phosphate ester of claim 14, wherein s and t are integers from 1 to 14.

16. The phosphate ester of claim 15, wherein said water solubilizing cationic ion is selected from the group consisting of alkali metal and ammonium.

17. The phosphate ester of claim 16, wherein said alkali metal is selected from the group consisting of sodium, potassium and lithium.

18. The phosphate ester of claim 17, wherein w is a number having an average value of from 1.0 to about 2.5.

19. The phosphate ester of claim 18, wherein a major portion of said phosphate ester molecules have a w value of 2.

20. The phosphate ester of claim 19, wherein $R_1$, $R_2$, $R_3$ and $R_4$ are independently fluorine or perhaloalkyl groups of one to three carbon atoms.

21. The phosphate esters of claim 15, wherein Z is selected from the group consisting of chlorine, hydroxy and OY, wherein Y is selected from the group consisting of sodium, potassium and ammonium.

22. The phosphate esters of claim 21, selected from the group consisting of
$[CF_3)_2CFOCF_2CH_2O]_2POOH$
$[(CF_3)_2CFO(CF_2)_3CH_2O]_2POOH$
$[(CF_3)_2CFO(CF_2)_5CH_2O]POOH$
$[(CF_3)_2CFO(CF_2)_7CH_2O]_2POOH$
$[(CF_3)_2CFO(CF_2)_9CH_2O]POOH$ 23. The phosphate ester of claim 20, wherein s is an integer from 2 to 8 and t is an integer from 1 to 11.

24. The phosphate ester of claim 20, wherein said perhaloalkyl groups are perfluoroalkyl groups of one to three carbon atoms.

25. The phosphate ester of claim 24, wherein s is an integer from 2 to 8 and t is an integer from 1 to 11.

26. The phosphate ester of claim 25, wherein $R_1$, $R_2$, $R_3$ and $R_4$ are fluorine.

27. The phosphate ester of claim 25, wherein Z is chlorine.

28. The phosphate ester of claim 27, wherein $R_1$–$R_4$ are fluorine.

29. The phosphate ester of claim 28, selected from the group consisting of
$[(CF_3)_2CFO(CF_2)_2(CH_2)_2O]_2POCl$
$[(CF_3)_2CFO(CF_2)_4(CH_2)_2O]_2POCl$
$[(CF_3)_2CFO(CF_2)_6(CH_2)_2O]_2POCl$
$[(CF_3)_2CFO(CF_2)_8(CH_2)_2O]_2POCl$ 30. The phosphate ester of claim 15, wherein Z is hydroxy.

31. The phosphate ester of claim 30, wherein $R_1$–$R_4$ are fluorine.

32. The phosphate ester of claim 31, selected from the group consisting of:
$[(CF_3)_2CFO(CF_2)_2(CH_2)_2O]_2POOH$
$[(CF_3)_2CFO(CF_2)_4(CH_2)_2O]_2POOH$
$[(CF_3)_2CFO(CF_2)_6(CH_2)_2O]_2POOH$
$[(CF_3)_2CFO(CF_2)_8(CH_2)_2O]_2POOH$ 33. The phosphate ester of claim 32 having the formula
$[(CF_3)_2CFO(CF_2)_2(CH_2)_2O]_2POOH$ 34. The phosphate ester of claim 32 having the formula
$[(CF_3)_2CFO(CF_2)_6(CH_2)_2O]_2POOH$ 35. The phosphate ester of claim 31, selected from the group consisting of
$[(CF_3)_2CFO(CF_2)_2(CH_2)_{11}O]_2POOH$
$[(CF_3)_2CFO(CF_2)_4(CH_2)_{11}O]_2POOH$
$[(CF_3)_2CFO(CF_2)_6(CH_2)_{11}O]_2POOH$
$[(CF_3)_2CFO(CF_2)_8(CH_2)_{11}O]_2POOH$ 36. The phosphate ester of claim 25, wherein Z is OY.

37. The phosphate ester of claim 36, wherein Y is sodium or potassium.

38. The phosphate ester of claim 37, wherein $R_1$–$R_4$ are fluorine.

39. The phosphate ester of claim 36, wherein Y is ammonium.

40. The phosphate ester of claim 39, wherein $R_1$–$R_4$ are fluorine.

41. The phosphate ester of claim 40, selected from the group consisting of:
$[(CF_3)_2CFO(CF_2)_2(CH_2)_2O]_2PO(ONH_4)$
$[(CF_3)_2CFO(CF_2)_4(CH_2)_2O]_2PO(ONH_4)$
$[(CF_2)_2CFO(CF_2)_6(CH_2)_2O]_2PO(ONH_4)$
$[(CF_2)_2CFO(CF_2)_8(CH_2)_2O]_2PO(ONH_4)$ 42. The phosphate ester of claim 41 having the formula
$[(CF_3)_2CFO(CF_2)_2(CH_2)_2O]_2PO(ONH_4)$ 43. The phosphate ester of claim 41 having the formula
$[(CF_3)_2CFO(CF_2)_6(CH_2)_2O]_2PO(ONH_4)$.

* * * * *

UNITED STATES PATENT OFFICE
CERTIFICATE OF CORRECTION

Patent No. __U.S.P. 3,692,885__  Dated __September 19, 1972__

Inventor(s) __LOUIS G. ANELLO ET AL__

It is certified that error appears in the above-identified patent and that said Letters Patent are hereby corrected as shown below:

Col. 2, line 5 - "$CX_3X_4)\underline{n}$" should read -- $CX_3X_4)_n-$ --;

Col. 2, first formula " $N\begin{smallmatrix}R_9\\R_{10}\end{smallmatrix}$ " should read -- $-N\begin{smallmatrix}R_9\\R_{10}\end{smallmatrix}$ --;

Col. 2, line 27 - "52 nine" should read -- nine --;

Col. 3, line 51 - "30°" should read -- 30°C --;

Col. 6, line 15 - "perfluoroisopropxyethyl" should read -- perfluoroisopropoxyethyl --;

Col. 6, line 42 - "$CF_2=CH_{bt}$" should read -- $CF_2=CH_2$ --;

Col. 6, line 45 - "$CF_2CFBr$" should read -- $CF_2=CFBr$ --;

Col. 7, line 26 - "$[(CF_3)_2CFO(CF_2)_6(CH_2)_2O]_2O]_2PO(ONH_4)$" should read

-- $[(CF_3)_2CFO(CF_2)_6(CH_2)_2O]_2PO(ONH_4)$ --;

Col. 8, line 31 - "having s $CF_2$" should read

-- having "s" $CF_2$ --;

Col. 13, line 42 - "-3,3,4,-4-" should read -- -3,3,4,4- --;

Col. 13, line 65 - "Example 1,8-hep-" should read

-- Example 1, 8-hep- --;

FORM PO-1050 (10-69)

UNITED STATES PATENT OFFICE
CERTIFICATE OF CORRECTION

Patent No. U.S.P. 3,692,885     Dated September 19, 1972

Inventor(s)  LOUIS G. ANELLO ET AL

It is certified that error appears in the above-identified patent and that said Letters Patent are hereby corrected as shown below:

Col. 14, line 6 - "dodecafluorooctyl phosphate" should read

-- dodecafluorooctyl) phosphate --;

Col. 17, after "We claim:" insert

-- 1. A phosphate ester of the formula --;

Col. 18, line 31, claim 11 - "2" should read -- 9 --;

Col. 18, line 65, claim 18 - "!7" should read -- 17 --;

Col. 19, claim 22, first part of each formula -

"$[CF_3)_2$"  should read  -- $[(CF_3)_2$ --.

Signed and sealed this 2nd day of July 1974.

(SEAL)
Attest:

EDWARD M. FLETCHER, JR.              C. MARSHALL DANN
Attesting Officer                     Commissioner of Patents